United States Patent [19]

Loos

[11] 4,068,558
[45] Jan. 17, 1978

[54] DEVICE FOR DEBURRING OR CHAMFERING OF THE FACE EDGES OF GEARS

[75] Inventor: Herbert Loos, Dorfen, Germany

[73] Assignee: Carl Hurth Maschinen- und Zahnradfabrik, Munich, Germany

[21] Appl. No.: 705,269

[22] Filed: July 14, 1976

[30] Foreign Application Priority Data

Aug. 2, 1975 Germany .......................... 2534574
Aug. 2, 1975 Germany .......................... 2534575

[51] Int. Cl.² .................... B23F 19/06; B26D 1/12
[52] U.S. Cl. .................... 90/1.6 A; 407/27; 407/31
[58] Field of Search ............ 29/103 C, 103 B, 105 R, 29/90.90, 104, 105 A; 90/1.6, 1.6 A, 2

[56] References Cited

U.S. PATENT DOCUMENTS

| 1,925,528 | 9/1933 | Fickett .................. 29/103 C |
| 2,119,298 | 5/1938 | Simowski ............... 90/1.6 A |
| 2,157,981 | 5/1939 | Drummond ............ 29/90.90 |
| 2,171,325 | 8/1939 | Hawgood ............... 90/1.6 A |
| 2,214,225 | 9/1940 | Drummond ............ 29/90.90 |
| 2,228,966 | 1/1941 | Miller ..................... 29/104 |
| 2,311,037 | 2/1943 | Drummond ............ 29/103 C |
| 2,682,100 | 6/1954 | Pelphrey ................ 29/105 A |
| 3,892,022 | 7/1975 | Johnson ................. 29/103 B |

FOREIGN PATENT DOCUMENTS

1,301,205 8/1969 Germany ..................... 90/1.6

*Primary Examiner*—Harrison L. Hinson
*Attorney, Agent, or Firm*—Blanchard, Flynn, Thiel, Boutell & Tanis

[57] ABSTRACT

A device for deburring or chamfering the axial edges of teeth on a workpiece. The device is composed of a guide disk having a pair of cutting disks on the axially facing sides thereof. The cutting disks each have teeth thereon as does the guide disk. The cutting disks are provided with cutting surfaces which engage the axial edges of the teeth of a workpiece to provide a chamfer therein. Structure is also provided for adjusting the cutting disks relative to the guide disk.

11 Claims, 10 Drawing Figures

DEVICE FOR DEBURRING OR CHAMFERING OF THE FACE EDGES OF GEARS

FIELD OF THE INVENTION

The invention relates to a device for deburring or chamfering of the edges on the tooth ends of gears having at least one gear-shaped cutting tool which works the tooth edges and a toothed guide wheel which is arranged axially besides said cutting tool is connected to same fixed with respect to rotation and mates with the workpiece.

BACKGROUND OF THE INVENTION

A device of the above-described type is already known, in which the axes of the workpiece on one side and tool and guide disk on the other side intersect at a distance, in which the edges of the teeth, which cooperate with the workpiece tooth ends, are sharp and in which the number of teeth of the tool has a relationship to the number of teeth of the workpiece which is such that after a number of rotations all workpiece teeth are worked. The crossed axes feature requires expensive structural support and, furthermore, the teeth of the tool cannot be manufactured easily. (German AS No. 2,157,619)

Therefore, the basic purpose of the invention is to provide a simpler device and tools herefor, which are simpler and can be manufactured with long-lasting means.

The basic purpose of the invention is attained with a device, in which a cutting tool rolls along with the workpiece with parallel axes and is provided with conical teeth which engage from the face the teeth of the workpiece, the flanks and/or addendum faces of which teeth have offsets which form cutting edges.

The tool which must be used for this is designed such that the conical teeth have grooves on the flanks, which grooves form cutting edges, which are inclined toward the rolling planes (planes lying in the direction of rotation), whereby it can be designed in detail so that the conical teeth have offsets or grooves on the top land surfaces, which offsets or grooves form cutting edges on the top land surfaces.

It can also be advantageous to inventively construct the tool in such a manner that the conical teeth have various tooth heights, whereby at least the longitudinal edges of the top land are constructed as cutting edges.

If cylindrical top land surfaces have cutting edges, then the workpiece root space is worked without producing a chamfer. However, if the top land surface is conical, then a chamfer is produced at the root.

To produce a chamfer at the tooth root, a development is advantageous in which the conical top land surfaces have offsets or grooves which form cutting edges.

A further purposes of the invention consists in a device of the above-described type, in which the size of the chamfers of the right and left flanks of the workpiece toothing can be selected relative to one another in their width or depth, in order to make sharpening of the tools easier. If the chamfers can be adjusted at the right and left flanks on the workpiece toothing, then the tool can be ground less exact.

This purpose is attained by a cutting tool or cutting tools being adjustable and securable in peripheral direction relative to a guide disk.

A further purposes of the invention is to avoid a so-called "burr of the second order", that is to prevent the device according to the invention from producing a burr, however, a smaller one.

This purposes is attained by the teeth of the guide disk being constructed so wide that their tooth flanks which rest on the tooth flanks of the workpiece end substantially with the inner edges of the chamfers, which must be produced, on the workpiece. If it is stated that the teeth of the guide disk are to end substantially with the inner edges, then this is supposed to express that differences within the limits of workshop tolerances still fall under the scope of the invention.

The last-described tool can be manufactured simply if the cutting tool is constructed as a helical spur gear in such a manner that the one tooth flank rolls on the chamfers of one tooth side and that for the chamfers of the other tooth side, the face edges of the tool are correspondingly chamfered.

Further advantages and characteristics of the invention will be disclosed in the following description.

BRIEF DESCRIPTION OF THE DRAWINGS

The invention will be discussed in connection with some exemplary embodiments illustrated in the drawings, in which.

DETAILED DESCRIPTION

Figure 3:
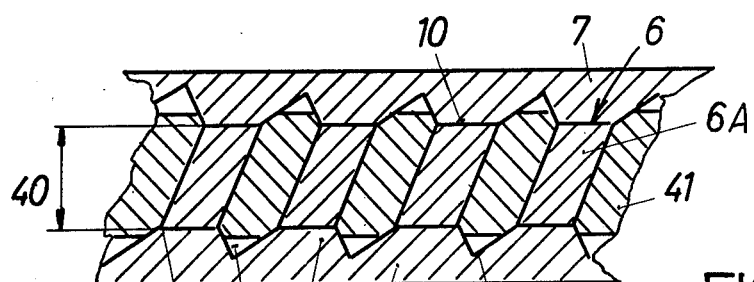
FIG. 3 is a cross-sectional view taken along the line III—III of FIG. 2 namely in a planar view.

The device according to the invention is to chamfer or deburr, the face edges 1 and/or the root edges 2 at the tooth ends of the teeth 3 of a workpiece 4. A device (FIG. 2) is provided for this purpose, in which the workpiece 4 and a toothed cutting tool 5 roll on one another with parallel axes 4A and 5A so that the teeth are in meshing relationship. The tool consists substantially of a non-cutting toothed guide disk 6 and a cutting disk 7,8 secured on each of the two axially facing sides thereof. The cutting disks 7,8 each have teeth 9 on the periphery thereof which are formed similarly to the teeth of bevel gears. The action of the cone can be achieved also in an advantageous manner by using the tool as a helically toothed spur gear, as is described in connection with FIGS. 8 to 10. The teeth of the cutting disks 7,8 project beyond the periphery of the guide disk 6 and into the tooth spaces of the workpiece, so that the flanks of the cutting disk teeth work the edges of the flanks and the root of the tooth space at the ends of the workpiece teeth. FIG. 3 illustrates a cross-section taken along the line III—III of FIG. 2.

Figure 2:
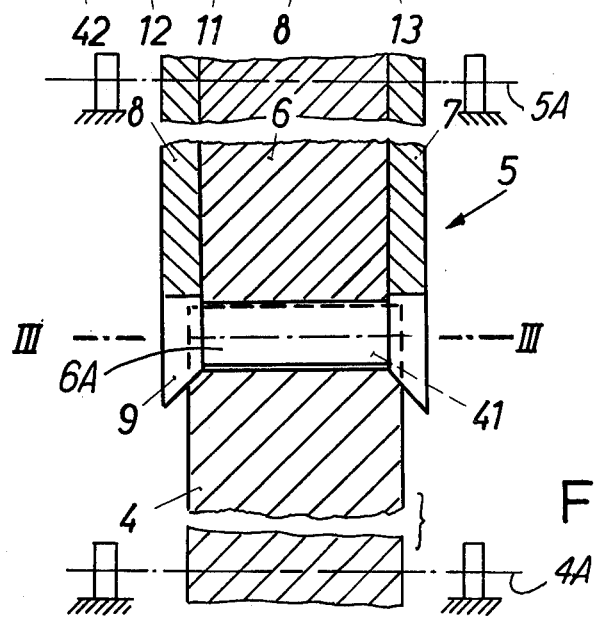
FIG. 2 illustrates schematically a section of a device embodying the invention, namely a cross section of the teeth which are in engagement.
Figure 1:
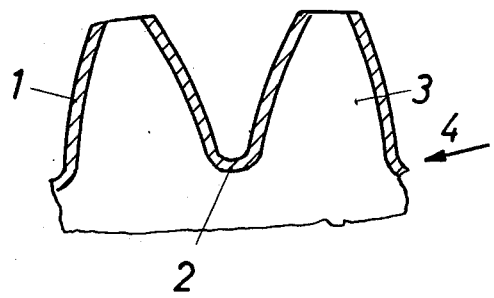
FIG. 1 illustrates a front view of an axially facing side of two workpiece teeth, the edges of which must be chamfered at the tooth ends with the device of the invention, as indicated by shading.

The teeth 10,11 of the cuttng disks 7',8' engage at the face or the axially facing side the tooth spaces of the workpiece. The cutting disks 7',8' in FIG. 3 differ from the ones in FIG. 2 because FIG. 2 illustrates fully constructed teeth 9 and spaces therebetween while in FIG. 3, the spaces 12 are constructed as grooves on the inside surface of the disks 7',8', which causes the cutting disks 7',8' to be more rigid. The teeth of the guide disk 6 are constructed as wide (dimension 40) as the width of the active profile of the workpiece teeth 41. Since the cutting disks 7',8' are secured directly to the faces, that is, the axially facing sides, of the guide disk 6, the teeth 6A of the guide disk finish the workpiece teeth at the inner edges 42 of chamfer 1, that is the innermost axially facing faces of the cutting disks lie in one plane with the inner edges of the chamfer to thereby prevent the formation of a burr or material accumulation in the vicinity of the chamfer on the active flank of the workpiece.

The tool is fed radially relative to the workpiece and the flanks 13 of the cutting disks press thereby onto the edges of the ends of the workpiece teeth and remove chips therefrom.

Figure 4:
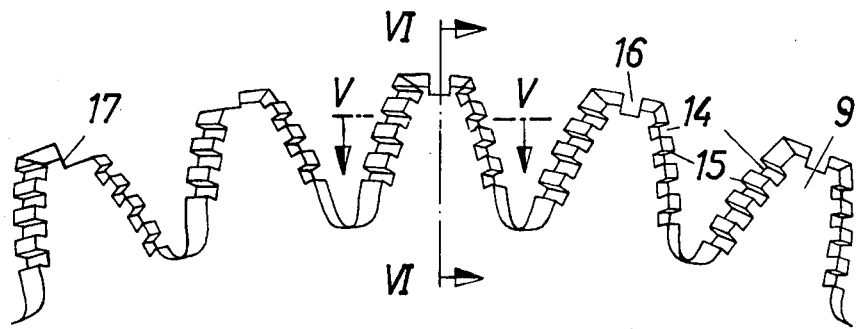
FIG. 4 schematically illustrates a view onto the face of some teeth of a cutting tool embodying the invention.

To facilitate the removal of the chips, the flanks of the teeth 9 or 10, 11 are provided with grooves 14 (FIG. 4) which are sloped toward the rolling or rotational plane. The walls of the grooves 14 form sharp cutting edges 15 with the tooth flanks and roll on the edges of the tooth ends of the workpiece and remove chips through the so-called elevational slide and thus chamfer, form chamfer or deburr the flank edges on the workpiece. The heads or top lands of the tool teeth are, however, also provided with grooves 16 or offsets 17 which form cutting edges and which chamfer, deburr or work in a different manner, the edges of the root of the tooth space on the workpiece.

Figure 5:
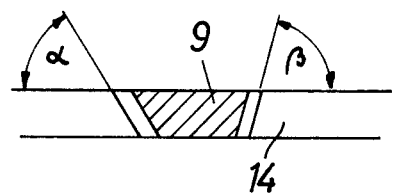
FIG. 5 illustrates a cross-sectional view taken along the lne V—V of FIG. 4.

FIG. 5 illustrates a cross-sectional view of the grooves of a cutting disk tooth, namely in a plane which lies parallel to the axis of rotation or, more precisely, which lies at a right angle with respect to the radius vector on the axis of rotation.

Figure 6:
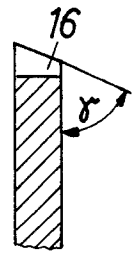
FIG. 6 illustrates a cross-sectional view taken along the line VI—VI of FIG. 4.

FIG. 6 illustrates a radial cross-sectional view of a cutting disk tooth and at the same time a groove 16 in the addendum or top land.

If helically toothed workpieces are worked, as is for example schematically illustrated in FIG. 3, then the angles of slope $\alpha$ and $\beta$ are different on both sides of the cutting disk tooth 9, so that chamfers having the same angles are obtained on the workpiece tooth. The angle $\delta$, which the cutting disk addendum or top land forms with the face, orients itself according to the desired chamfer at the root space between the workpiece teeth.

Figure 7:
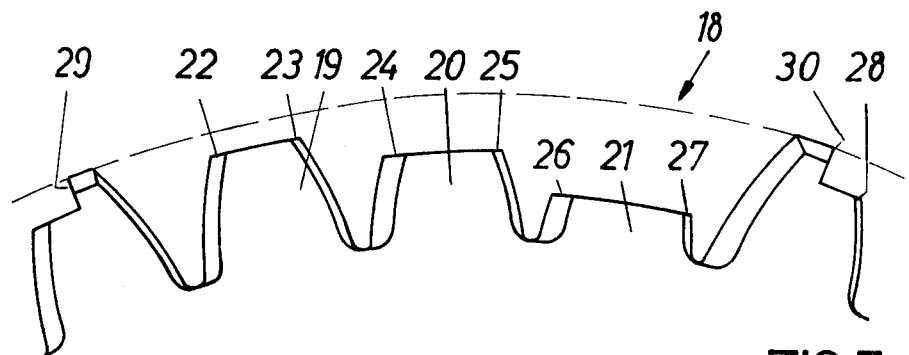
FIG. 7 schematically illustrates the view onto the face of some teeth of a different embodiment of a cutting tool embodying the invention.

FIG. 7 illustrates an embodiment of a cutting disk 18 embodying the invention in which the teeth 19, 20, 21 are constructed to have different heights. The edges of the top land surfaces and the tooth flanks form cutting edges 22 to 28 for working the flank edges on the face of the workpiece. Furthermore, the cutting disk is provided with teeth having a higher top land surface than the teeth 19, 20, 21, which higher teeth have offsets at the juncture between the top land and tooth flank which form cutting edges 29,30 for working the edges at the root space between the workpiece teeth.

The tooth angles on the cutting disks, as they have been described up to now, are slightly cumbersome in manufacture, when they serve to work helically toothed workpieces due to the requirement that different angles must be provided on the two sides of the tooth as is schematically illustrated in FIG. 5. In the embodiment according to FIGS. 8 and 9, the cutting disks 43,44 are constructed as helically toothed spur gears, the one tooth flank 45,46 works the chamfer on one side of the workpiece teeth 47. In order to produce the chamfer on the other side of the workpiece teeth, the face edges are chamfered or sloped on the other tooth side of the tool teeth as at 48 (chamfer 48). Since the cutting disk is a spur gear having teeth inclined to the right and the other one a spur gear which has teeth inclined to the left, nevertheless, the chamfers 48 on the face edges of the workpiece have the same angle relative to a central axial plane through the guide disk 49 and the teeth of the one cutting disk are thicker in the exemplary embodiment than the ones of the other disk.

The cutting disks can be adjusted and secured relative to the guide disk 49 in a peripheral direction. For this purpose the following device is provided according to FIGS. 8 and 9. The cutting disks 43,44 each have one abutment 50,51 thereon. On both sides of these abutments, the guide disk 49 is equipped with two fixed, axially extending pins 52, 53, which are so long that they correspond approximately to the dimension between the axially outer surface of one abutment 50 to the axially outer surface of the other abutment 51. Holes 54,55 larger in diameter than the pins 52,53 extend through the cutting disks 43,44 and each receive one pin therethrough so that a movement in peripheral direction of the cutting disks relative to the guide disk is possible. The ends of the pins have threaded holes therethrough perpendicular to the axis of the pins, into which threaded holes are screwed adjusting screws 56 to 59 which engage the abutments 50,51. By adjusting these adjusting screws, the said peripheral adjustment can take place, through which the chamfer on the one side of the workpiece teeth can be adjusted relative to the chamfer on the other side. If the cutting disks are to be adjusted together relative to the guide disk, then they are clamped together to form one unit with fastening screws 60.

Figure 10:
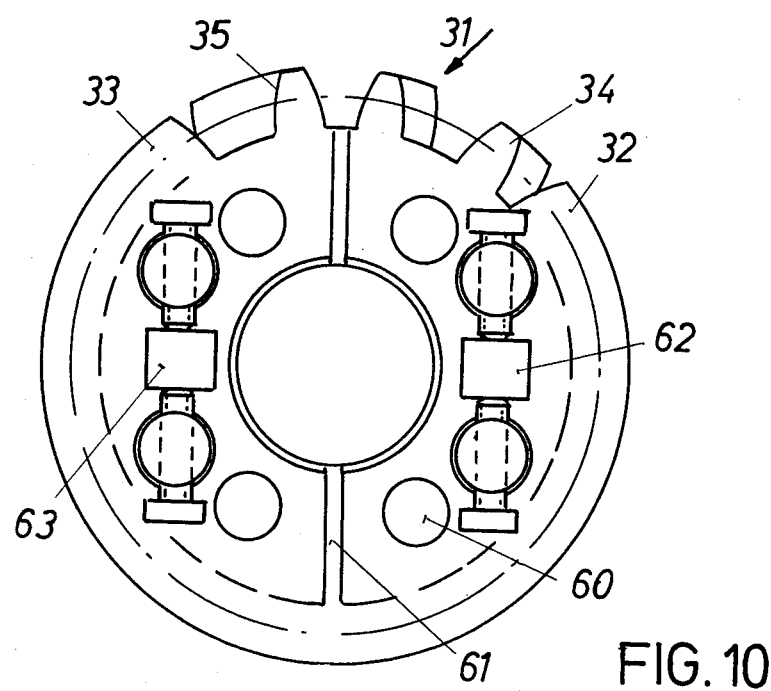
FIG. 10 illustrates an axially facing side of a further exemplary embodiment of the invention.

In the embodiment according to FIG. 10, the cutting disk 31 consists inventively of two halves 32,33. Each half having teeth 34,35 of a helical gear, that is each having an opposite-hand helix angle. Each half 32,33 of the cutting disk is designated for working the chamfer on one tooth side of the workpiece.

Such cutting disks are manufactured simpler, because per cutting tool two full cutting disks can be manufactured each having one single angle of tooth which correspond each to one tooth side of the workpiece. These cutting disks are then cut apart. Two different halves are then secured on each side of the guide disk. Of course, the number of teeth of the cutting tool must then be selected such that after a certain number of rotations all teeth of the workpiece come into contact with the teeth of both halves. This occurs, for example, if the number of teeth of the cutting tool has no common factor with the tooth count of the cutting tool.

A joint 61 exists between the cutting disk halves so that an adjustment of each cutting disk half relative to the guide disk and thus also relative to the workpiece is possible. An adjusting device 62,63 is provided for each cutting disk half, as was described in connection with FIGS. 8 and 9. FIG. 10 shows the cutting disk halves like halves of common helical gears. Of course the teeth have cutting edges, as is shown exemplarily in FIGS. 4 to 7.

Figure 8:
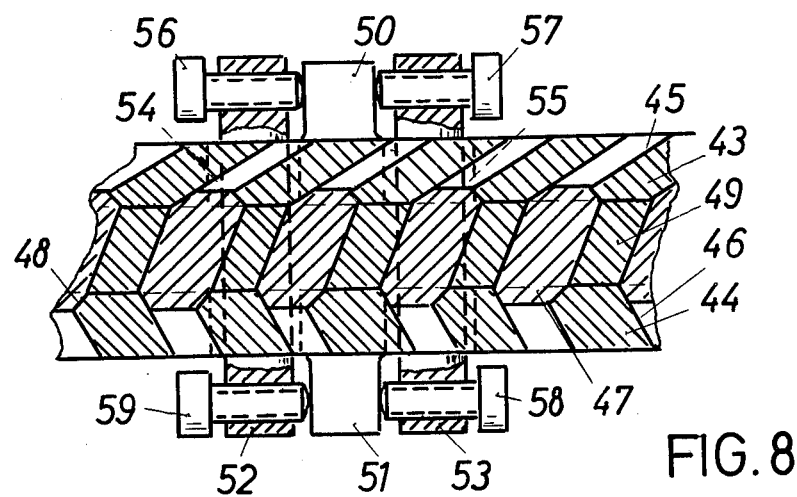
FIG. 8 illustrates schematically and in a planar view a cross section of the teeth of a workpiece and a cutting tool, which teeth are in engagement, wherein the cutting diss can be adjusted inventively relative to a guide wheel.
Figure 9:
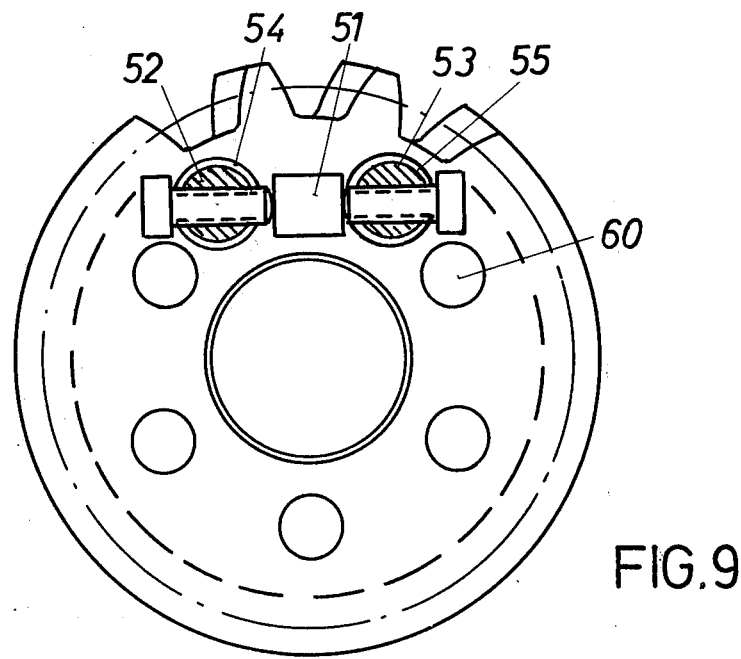
FIG. 9 illustrates an axially facing side of the device of FIG. 8.

Each cutting disk tooth works each with one flank only the chamfer on one single side of the workpiece teeth (differing from FIG. 8, for example, whereby each cutting disk tooth works the chamfers of both tooth sides of the workpiece teeth). In connection with the adjusting device 62,63, the sharpening of the cutting disks becomes very simple because they need to be ground only on the face side. The working cutting disk flanks can then with the adjusting device 62, 63 be moved each into the correct position with respect to the chamfers which must be worked.

Although particular preferred embodiments of the invention have disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a device for deburring or chamfering the axial edges of teeth on a workpiece, the improvement comprising:
   a tool having a toothed, non-cutting guide disk and at least one toothed cutting disk fixedly mounted on an axially facing side of said guide disk, the teeth on said guide disk being axially aligned with the teeth on said cutting disk, each tooth on said cutting disk having on the edges thereof adjacent said guide disk a beveled surface facing axially toward said cutting disk, said beveled surface having cutting means thereon whereby a meshing engagement of said tool with said workpiece will effect an engagement of said beveled surface and said cutting means thereon and a cutting of a beveled edge on the corresponding axially facing edge of the teeth on said workpiece.

2. The improvement according to claim 1 wherein said cutting means are defined by a plurality of grooves in said beveled surface located on the flank portion thereof.

3. The improvement according to claim 1, wherein said beveled surface extends along the top land portion of selected ones of said teeth on said cutting disk; and
   wherein said cutting means are defined grooves in the top land portion of said beveled surface.

4. The improvement according to claim 1, wherein said teeth on said cutting disk have various tooth heights; and
   wherein said cutting means are defined by the edges between said top land portion of each tooth and the flank portion of said beveled surface.

5. The improvement according to claim 4, wherein said top land surface on selected ones of said teeth on said cutting disk have cut-out portions, the edges of which define said cutting means.

6. The improvement according to claim 1, wherein said tool includes adjustment means for adjustably securing said cutting disk to said guide disk to effect a peripheral shifting of said cutting disk teeth relative to said guide disk teeth.

7. The improvement according to claim 1, wherein the width of said guide disk is selected to be less than the width of said workpiece by an amount equal to the desired location for the inner edge of a chamfer produced on said workpiece.

8. The improvement according to claim 1, wherein said tooth includes a pair of cutting disks secured to the opposite axial sides of said guide disk.

9. The improvement according to claim 8, wherein said tool is constructed as a helical spur gear, said cutting disks being peripherally offset in opposite directions relative to the helical teeth on said guide disk.

10. The improvement according to claim 9, wherein said beveled surfaces on said flank portion of said teeth on said cutting disk are inclined at differing angles on the opposite edges of each tooth.

11. The improvement according to claim 1, wherein said device includes means for supporting said tool and said workpiece so that the axes thereof are parallel.

* * * * *

UNITED STATES PATENT OFFICE
CERTIFICATE OF CORRECTION

Patent No. 4 068 558   Dated   January 17, 1978

Inventor(s) Herbert Loos

It is certified that error appears in the above-identified patent and that said Letters Patent are hereby corrected as shown below:

Col. 5, line 38; change "cutting" (first occurrence) to

---guide---.

Signed and Sealed this

Tenth Day of November 1981

|SEAL|

Attest:

GERALD J. MOSSINGHOFF

Attesting Officer   Commissioner of Patents and Trademarks